United States Patent
Mullen

(10) Patent No.: US 9,325,747 B2
(45) Date of Patent: *Apr. 26, 2016

(54) ADVANCED DATING WEBSITES

(71) Applicant: Jeffrey David Mullen, Pittsburgh, PA (US)

(72) Inventor: Jeffrey David Mullen, Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/187,230

(22) Filed: Feb. 22, 2014

(65) Prior Publication Data
US 2014/0171046 A1 Jun. 19, 2014

Related U.S. Application Data

(63) Continuation of application No. 12/248,492, filed on Oct. 9, 2008, now Pat. No. 8,693,653.

(60) Provisional application No. 60/978,636, filed on Oct. 9, 2007.

(51) Int. Cl.
| | |
|---|---|
| H04M 3/42 | (2006.01) |
| H04L 29/06 | (2006.01) |
| H04M 3/493 | (2006.01) |
| H04M 7/00 | (2006.01) |
| H04W 4/16 | (2009.01) |

(52) U.S. Cl.
CPC ......... *H04L 65/1069* (2013.01); *H04M 3/4938* (2013.01); *H04M 7/0024* (2013.01); *H04W 4/16* (2013.01)

(58) Field of Classification Search
USPC ...................... 379/201.01; 709/203
See application file for complete search history.

(56) References Cited

U.S. PATENT DOCUMENTS

| | | | |
|---|---|---|---|
| 5,588,049 A | 12/1996 | Detering et al. | |
| 5,793,857 A | 8/1998 | Barnes | |
| 6,108,408 A | 8/2000 | Plunkett | |
| 6,195,417 B1 | 2/2001 | Dans | |
| 6,330,315 B1 | 12/2001 | Kapsales et al. | |
| 6,560,224 B1 | 5/2003 | Kung et al. | |
| 6,694,005 B1 | 2/2004 | Pilkerton | |
| 7,444,148 B1 * | 10/2008 | Cook .......................... | 455/435.1 |
| 8,175,250 B2 | 5/2012 | Creamer et al. | |
| 8,249,246 B1 | 8/2012 | Yablon | |
| 8,532,695 B2 | 9/2013 | Suetsugu | |
| 2003/0103607 A1 * | 6/2003 | Feakes ........................ | 379/88.17 |
| 2006/0140200 A1 | 6/2006 | Black et al. | |
| 2006/0141981 A1 | 6/2006 | Lin | |
| 2006/0177029 A1 | 8/2006 | Dotan et al. | |

* cited by examiner

*Primary Examiner* — Quynh Nguyen

(57) ABSTRACT

Social websites, such as dating websites, are provided with advanced features. For example, a dynamic telephone number generator is provided that may be associated to a destination telephone number. Someone calling that dynamic telephone number may be routed to the destination number. The dynamic number may be generated as a result of receiving user input to a dating website. Additionally, a dynamic number may call a user's web browser directly such that users can utilize traditional telephone lines to talk over the internet to a website.

11 Claims, 6 Drawing Sheets

ADVANCED DATING WEBSITES

CROSS-REFERENCE TO RELATED APPLICATION

This application is a continuation of U.S. patent application Ser. No. 12/248,492 filed on Oct. 9, 2008, which claims the benefit of U.S. Provisional Patent Application No. 60/978,636 filed on Oct. 9, 2007, which are hereby incorporated by reference herein in their entirety.

BACKGROUND OF THE INVENTION

This invention relates to social websites such as dating websites.

SUMMARY OF THE INVENTION

Social websites, such as dating, gaming, and networking websites, are provided with increased functionalities such as increased audio communications functionality.

A secure telephone number generation and distribution system is provided. A user can press a button on a graphical user interface and have a dynamic telephone number generated for a particular number of uses, a particular period of time, or until a new number is requested. Accordingly, a user can talk to another user virtually (e.g., via an instant message, chat, or email) and provide a dynamic telephone number to the other user when the user desires to have a telephone conversation. The dynamic telephone number may be associated with a router that routes a call to the dynamic telephone number to a particular telephone (e.g., the mobile telephone of the user that generated the dynamic telephone number). Alternatively, the dynamic telephone number may be associated with a router that routes a call to a particular computer or webpage (e.g., a window of a GUI for a dating website the user that generated the dynamic telephone number is utilizing). Accordingly, a telephone-to-webpage audio, or telephone-to-webcam chat audio is provided. The dynamic telephone number for a user may be saved such that the dynamic telephone number is associated with the user whenever the user at least logs into the dating service (e.g., website). A cost or no cost may be associated with the generation and/or use of a dynamic telephone number. For example, the dynamic telephone number service may be associated with a particular cost (e.g., $5/month or more) and every dynamic generation beyond a threshold number of generations (e.g., 5 or more) may also be associated with a cost (e.g., $1 or more). In this manner, a secure way of communicating with a person over the phone is provided.

A dynamic telephone number may also be generated on a cell phone or other device. For example, a user of a mobile telephonic device may request that a dynamic number be generated that is associated to the users telephone upon which the request is made. In this manner, a user can meet another user at a bar and can provide this other user with a dynamic telephone number. In doing so, the user can control when the dynamic telephone number is operational (e.g., via an online website or the telephone) or when the dynamic telephone number is changed. A telephone or website may alternatively generate a identification code for a user and the user can provide this identification code to another user. The other user may, in turn, call a general number and enter in this identification code to be routed to a device associated with the user that generated the identification code. For security purposes, the dynamic telephone number or identification code may be pushed to the other user such that the user associated with the dynamic number/code is not aware or the number/code provided. In doing so, the system controlling the information can control the distribution of information (e.g., numbers) such that an elevated level of security is added. If a problem arises, the system can assist in identifying a participant (e.g., the participant to which a dynamic number was pushed to).

Dating games may be provided that allow a user to go on a virtual date with another user. In doing so, two users can not only talk to one another, but two users can engage in an activity with one another (e.g., a card game such as poker). The two users may also be provided with video from one another (e.g., via a webcam). Virtual tokens or other virtual payment mediums may be purchased for dates such as games. Success in a game may also reward each participant (or the paying participant) in virtual reward mediums (e.g., virtual prize tickets) that can be exchanged for prizes. Accordingly, the whimsical and festive nature of the dating website may be enhanced.

Users can leave feedback for one another for both real and virtual dates. Information for the feedback can take many forms. For example, feedback may include just the fact that two people went on a date such that a third user can gain confidence that the participants do not "stand up" users with respect to dates. Feedback can also take the form of, for example, verification of particular information of one's portfolio. For example, a feedback may take the form of a YES or NO that a particular user looks like his/her user profile.

A calendar is provided that allows a user to keep track of his/her dates. Additionally, a date may be constructed by, for example, an autonomous program or an administrator. The program may utilize the profiles of both users and a particular date to offer a suggestion on a possible real date. The service may also, for example, purchase the appropriate tickets and/or make the appropriate reservations should both parties accept the date. Such a service may create a more comfortable dating experience as both parties would know that a third party constructed the date. Furthermore, such a service may create an additional layer of security as a third party may keep a record of the planned date.

Dynamic email addresses, chat handles, and dynamic fax numbers are also provided. In this manner a user can meet another user online, initiate a request for dynamic information, and communicate with the other user via a communication tool associated with the dynamic information with the knowledge that new dynamic information can be created at any time.

When a user calls a dynamic telephone number, a message may be provided to a user to notify the user that the number is, in fact, a dynamic number. The user may be prompted to confirm that the user wants to continue with the call before, for example, the call is routed to the user associated with the dynamic telephone number. Additionally, a user calling a dynamic telephone number may be requested to enter in a code before a call is routed. The code may, for example, be representative of a time when the dynamic number was last generated. As such, a user may be prompted if the dynamic number was generated again recently and, if so, then the user's call may not be routed to the dynamic telephone number. In this way, a user can be protected against receiving calls from strangers if a dynamic telephone number has been generated/reused a large number of times.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
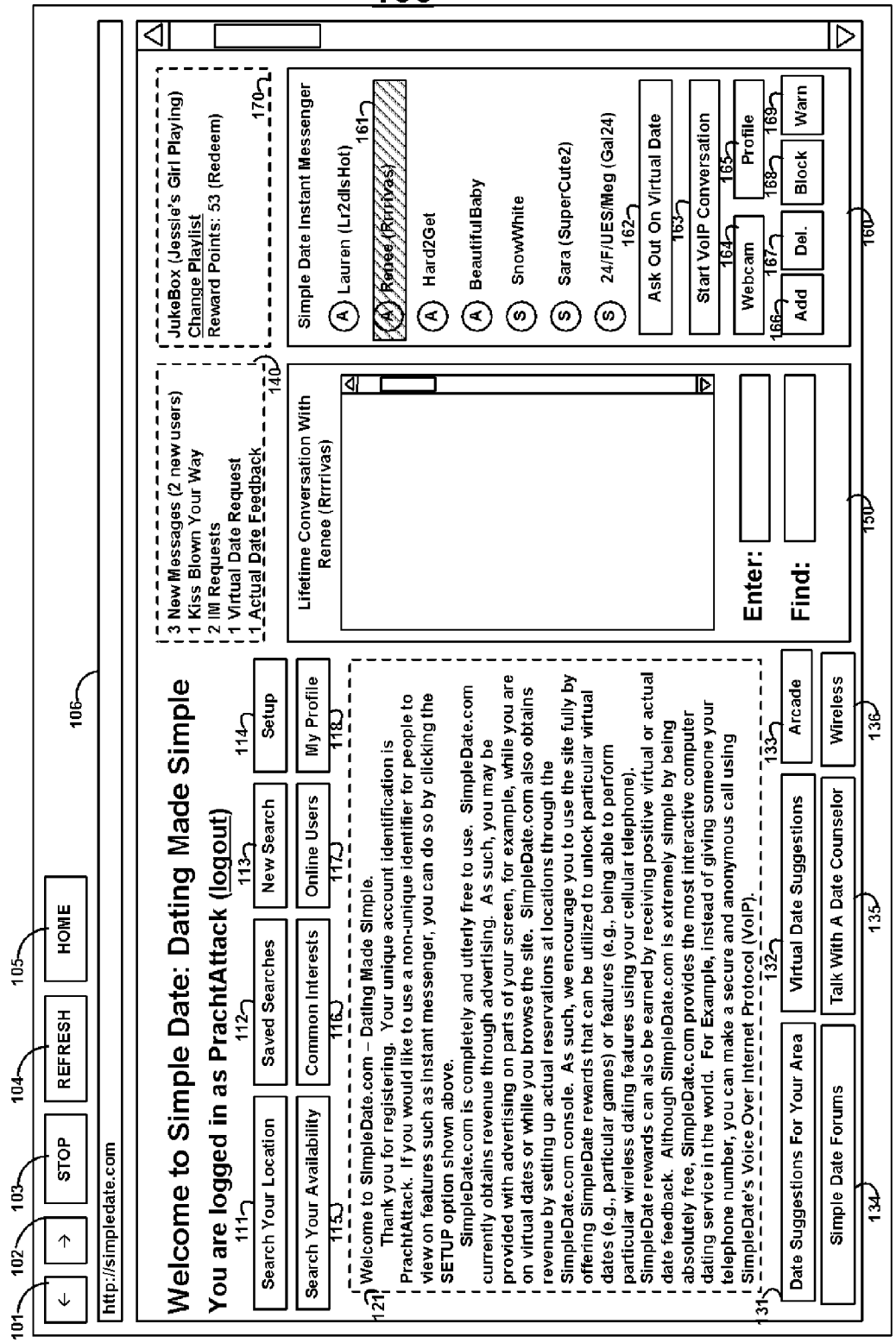
FIG. 1 is an illustration of a graphical user interface for a dating website constructed in accordance with the principles of the present invention.

FIG. 1 shows Graphical User Interface (GUI) 100 that includes back control 101, forward control 102, stop control 103, refresh control 104, and home control 105. Persons skilled in the art will appreciate that GUI 100 may take the form of an internet browser visiting a website (e.g., site 105) that hosts a social website such as a dating website. GUI 100 may also take the form of an interface on a device, such as a mobile telephonic device.

GUI 100 may include, for example, search your location button 111, which may allow a user to perform a search for users in a particular location (e.g., city, state, zip code). Such a search may be tasked for a particular subset of users. For example, if the user indicated that the user was desirous of meeting women, search your location button 111 may return women users or rank women users higher than non-women users. Saved search button 112 may be included such that a user may create, modify, store, delete, and initiate saved searches. Button 113 may be provided to allow a user to, for example, initiate a search. Setup 114 may allow a user to change, for example, the users dating preferences, account information, profile information, or any other type of information.

Search your availability button 115 may initiate a GUI that includes a calendar such that events (e.g., virtual and/or actual dates) may be scheduled. Such a calendar may export data to, and import data from, a different calendar program or a different device utilizing the same calendar program (e.g., a laptop, mobile telephonic device, or stationary computer). Emails, or any other type of communications such as calendar event notifications, can include buttons that allow a user to accept, deny, or suggest a day and time for a date. In allowing a person to request a date via a website, users that are extremely shy may be, for example, more willing to engage in asking users out on dates. Accordingly, a user may, for example, request a virtual date with another user. A server may recognize that the requested user's settings allow for calendar notifications to be sent via email to a particular email address. Accordingly, the server may send a calendar event request through the user's preset communications preferences for virtual date requests. The requesting user may then be informed that the request was delivered. The requesting user may be informed on how the request was delivered (e.g., via a template email, a calendar program's event request email, a dating website's internal email/messaging system, or a text message or voice message, via a computer text-to-speech algorithm, to a mobile device).

GUI 100 may include common interest button 116 that may initiate a comparison of the profiles of two or more users. For example, common interests 116 may be initiated for the user of GUI 100 and a user that the user of GUI 100 desires. Common interests 116 may provide a list of the common interests between these two users. Such interests may include, for example, favorite virtual dates (e.g., online games such as checkers or chess), favorite restaurants (e.g., actual dates restaurants), favorite activities (e.g., playing ultimate Frisbee), favorite movies (e.g., romance movies), etc. Common interest button 116 may also provide a list of differences between users. Common interest button 116 may provide date request buttons next to each activity. Accordingly, if both users like to play a particular virtual card game, the list can include a button that will prompt one, or both users, for permission to enter them into a virtual date of that particular virtual card game.

Online users button 117 may be initiated in order to, for example, initiate the display of information representative of those users that are online for any given time. Such users may be categorized based on similarities or search/preference criteria set by the user of GUI 100. Each user may select an graphical avatar that may be associated with the user in an online space. The user may build his/her own avatar or may select a premade avatar. Additionally, a user may create an avatar in two or three dimensions. The user may thus be provided with an animated three-dimensional avatar. A user may create behaviors for such an avatar via animation tools or behavior setting tools. Accordingly, for example, a user may be allowed to enter in tags in a communication, such as an instant message communication, that trigger the three-dimensional avatar to execute a behavior. For example, a user may enter a ":-)" and that may allow not only a smiley face ☺ to be communicated through instant messaging software in written indicia, but may cause the avatar to perform an associated behavior (e.g., smile). The user's may also use such three-dimensional avatars in virtual worlds. For example, the website may allow a user to ask another user out on a virtual date. Such a virtual date may take the form of an environment that has multiple activities for virtual dates. For example, such a virtual date may be a virtual zoo, a virtual aquarium, a virtual carnival, a virtual theme park (e.g., virtual Disney World). Each themed environment may include multiple games. When two users go on a virtual date to a virtual carnival, for example, the avatars of each user may be provided by each avatar. The user's may go around to virtual game booths and play virtual games together. Virtual money, associated with an actual currency, may be purchased and used in the environment and prize tickets may be obtained for use in paying for future website functionality (e.g., additional virtual dates) or prizes (e.g., virtual enhancements to avatars). For example, prize tickets may take the form of new avatar capabilities. A virtual date where one throws virtual darts at virtual targets may win an avatar virtual sunglasses. Thus, a user may select these sunglasses to be used by an avatar. Accordingly, the users are motivated to interact with one another and go on additional virtual dates. A user that is on a virtual date may thus enter in tags into his/her keyboard to have the virtual avatar displayed on the screen perform a customized, or predetermined, action. Actions themselves (e.g., laughing, smiling) can be purchased either via actual or virtual currency. A user may speak into a microphone and audio may be delivered via each avatar.

Profile button 118 may be provided such that a user may change his/her likes/dislikes, contact information, information that may be made publicly available to other users, billing/payment information, or any other type of information.

Portion 121 may be provided, for example, in order to provide information and features to a user. When a user initiates a feature (e.g., clicks a button), portion 121 may be utilized to provide that feature to a user. Persons skilled in the art will appreciate that the any of the features may be provided free-of-charge or may be associated with the cost. Accordingly, a website incorporating features may be free-of-charge or may be associated with one or more costs. For example, a periodic subscription and a feature-based cost structure may be implemented. As per another example a site may be free-of-charge but one or more dynamic information features (e.g., dynamic telephone number generation) may be utilized at a cost.

Advertising may be provided in order to, for example, generate revenue. Advertising may be provided during a virtual date. For example, suppose a virtual date is the simultaneous viewing of a video file where the user's microphone inputs can be heard in conjunction with viewing the video. Here, for example, an advertisement may be provided before the video starts (and may not transfer the user's audio data such that the advertisement can include sound that can be heard without interruption.

A virtual date may include, for example, a virtual movie. Here, for example, both users may be streamed video at the same time such that users may experience a commercial, television show, advertisement, or a movie together. Any media (e.g., music) can be utilized as part of a virtual date. Accordingly, for example, one user may rent a movie for both users to watch. The renting user may purchase the movie (e.g., purchase the date). Alternatively, for example, the users may select a payment option where the users split the price of the movie. Media may also be downloaded and started by different users on a date at the same time. For example, a "start date now" button may be provided that initiates a synchronized start time for movies for two users on a date. Persons skilled in the art will appreciate that a higher cost for a movie may be provided if users select to split the price versus if one user selects to pay the entire price. For example, a movie may cost $5 if one user pays, but $3 each if both users pay (e.g., $6 total). Alternatively, for example, the price may be the same regardless of how the price is split between users. A user may associate a particular payment method (e.g., credit card or online payment ecosystem) for paying for virtual dates. A periodic (e.g., annual) fee may also be associated with particular features or use of the website with all features. Different levels of membership may provide users with different sets of features.

Reservations and tickets for a particular date may also be autonomously purchased when a date is agreed upon by two users. Accordingly, for example, one user can ask the other user out to a concert and, as soon as the other user accepts the date, a remote server may automatically purchase two tickets to the event in order to maximize the chance that the tickets can be obtained before the tickets are sold out. A cost may be associated with such an action and one or both user accounts may be charged accordingly (e.g., if a user agrees to pay for the event or both users agree to split the cost). A cost may be provided to a vender (e.g., a ticket provider or restaurant) that utilizes this service. By employing a vendor-based cost, a user may not be required to pay for the date setup service.

Virtual dates may also require reservations. For example, a virtual movie may be shown on the website for all users at the same time. A limited number of tickets for such a virtual date may be made available to the website's user base. Accordingly, for example, users may schedule virtual dates and may watch movies with their dates on the computers. Only people on a virtual date may, for example, talk to one-another via a closed audio loop. Or, everyone's voice may be muffled and heard by everyone watching the movie to create an environment more associated with that of a movie theater. A user may watch, for example, the movie on his/her television set if desired via an intermediary device that may receive media directly from a source (e.g., a dating website's server) or from a user's computer. Each user may purchase tickets to the movie. Singles may also watch a movie and the users may be provided with a place to socialize (e.g., a pre-movie reception room) using their virtual avatars. Users may then select other users to watch the movie with such that a virtual date is provided. After a movie, a user may also choose to go into a post-movie reception room or environment. The environment may be, for example, accessed for a particular amount of time with a virtual movie ticket purchase before the environment is closed or a user is required to pay an additional fee to stay in the virtual environment. Accordingly, for example, such a virtual environment would provide users with not only a place to date but a place to find dates while increasing the user's connection with the environment (e.g., delivering more whimsical and festive value to the user).

Virtual date suggestions button 132 may provide a list of all, or a portion of, virtual dates that users may take part in. A virtual date may be setup between two or more users. For example, two users may go on a virtual date that is a game of chess played over the computer. Voice and/or video data of each user may be transferred to the other user such that the two users can converse while on their virtual date. Virtual dates may also include, for example, the mutual listening to a song or the mutual viewing of a media segment. Virtual dates may also be group based and may include, for example, speed dating such that every user that signs up for a virtual speed date is placed on a rotation to talk to another type of user. For example, a men-and-women speed date may be setup that includes 10 slots for men and 10 slots for women. The speed dates may be 6 minutes long such that the entire event lasts an hour. Accordingly, a male user will automatically cycle, every six minutes, to a new female user. The speed date can include, for example, a short virtual date and communication can occur over video and/or voice data. A user may be provided with the opportunity to save the other user as a successful speed date such that the user can follow up with the other user. A successful speed date feature, however, may require, for example, a mutual agreement between the two users. Virtual dates may also occur over time. For example, if a virtual game of monopoly is being played by two people during a virtual date and one person has to leave, one of the users may prompt the system to pause the virtual date. This virtual date may be continued at a later time when both users are online. Alternatively, for example, the virtual date may be continued by one person making a move at one time (when the other user is not online) and the other person making another move at a different time. Group virtual dates may also be provided.

Arcade 133 may be provided that may provide a list of virtual dates that a user can select and request another user to take part in. Arcade 133 may also include a list of people that want to play a game and are waiting for the right person to play the game with. Users may be able to screen, for example, users that want to play a game with them so that the users may, for example, play games with particular users.

Forums 134 may provide any number of forums in which users can post and view information. Forums may have categories as well as may provide ways for users to post customer service questions.

Date counselor button 135 may be provided to allow a user to talk with an advisor for free or for a particular cost. Such an advisor can proffer advice on restaurants, events, virtual dates, or general relationship device (e.g., how can I cancel a date politely?). Such an advisor may provide advice via a virtual avatar in a virtual environment or may provide advice through audio, emails, a video/audio webcam chat, or via a telephone call. Persons skilled in the art will appreciate that a video/audio webcam box may be provided in any online dating setting. For example, if users go on a virtual movie date or if users go on a date to a virtual environment using virtual avatars, an audio/video webcam box may also be provided to the user such that users can see each other and talk to each other while using avatars to explore a virtual environment.

Wireless button 136 may allow a user to setup wireless options. For example, a user may have a wireless telephone number associated with button 136 and may have initiated a feature that provides search matches on a wireless telephone for those users within a particular distance of that user's wireless telephone. In this manner, the location of a mobile device may be obtained via, for example, a GPS signal and this GPS signal may be utilized in deciding what information is provided to a particular user on his/her mobile device.

Portion 140 may be provided in order to disseminate additional information to a user. For example, portion 140 may include the number of messages in a users inbox (e.g., and how many messages are from new users), the number and/or type of virtual signs of affection are provided to a user, the number of IM requests, the number of virtual and/or actual date requests, and the number of new feedback (from both virtual and/or actual dates). Users may click on a portion of a piece of information (e.g., number of date requests) in order to be provided with expanded information on that topic (e.g., the details of each date request).

Portion 150 may be provided in order to provide an embedded instant messaging service. The entire conversation with a user (or the conversation for a period of time or until the conversation is manually cleared) may be viewed as part of an instant messaging (IM). Persons skilled in the art will appreciate that each user of an IM conversation may control when his/her own copy of an IM conversation is cleared.

Portion 170 may be included to display additional information. For example, portion 170 may display, for example, a jukebox with a playlist and the name of the song that is playing. Portion 170 may also keep track of how many reward points are available to be redeemed. Reward points may be provided based on, for example, the number of activities a user performs that generates advertising revenue. For example, if a virtual date results in advertising revenue than that virtual date may provide a user with reward points. Reward points may also be provided, for example, when a user's profile is verified by date feedback from another user. Accordingly, reward points may promote the use of the site as well as the proper use of the site. Reward points may be redeemable, for example, for particular virtual dates or features (e.g., dynamic telephone number generation). Reward points may also be purchased at a cost.

Instant Messenger portion 160 may be provided. Portion 160 may provide a list of users that have been added to an instant messaging feature by a user. Additionally, for example, portion 160 may allow a user to search other users that are online (e.g., via searching categories of online users). Ask out on a virtual date button 162 may ask the user (or users) highlighted by selection tool 161 if a virtual date is desired. Button 163 may be initiate to start a voice conversation. Button 164 may be initiated to start a voice and/or video conversation via a webcam. Button 165 may be selected in order to obtain the profile for a selected user (or users). Add button 166 may be provided to add a user to a particular instant messenger or instant messenger group. Delete button 167 may remove a user. Block button 168 may block a user from interacting with the user on an instant messenger (and a variety of other services such as email). Button 169 may warn a user of inappropriate behavior.

Figure 2:
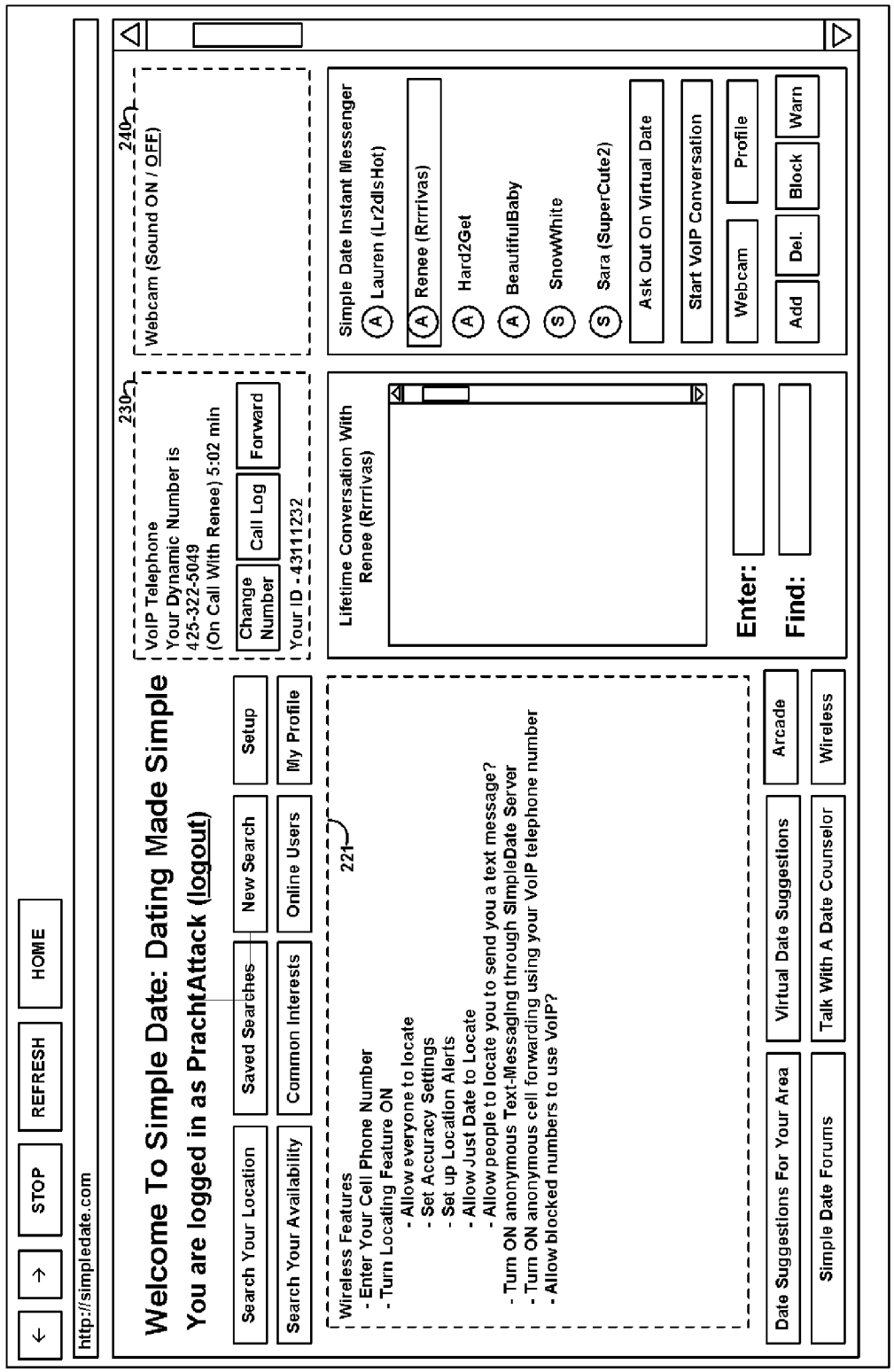
FIG. 2 is an illustration of a graphical user interface for a dating website constructed in accordance with the principles of the present invention.

FIG. 2 shows GUI 200 that may include portion 221. Portion 221 may include a number of wireless features such as the ability to enter one or more telephone numbers (e.g., landline and/or cell numbers). Portion 221 may include the ability to allow all users of a dating system to obtain the location of a user and the ability for the user to control who and when the location can be obtained. Location alerts may be setup from portion 221 such that, for example, a user can receive an alert (e.g., a text message) when another user meets particular location criteria (e.g., enters New York City). Such a feature may be useful, for example, in connection with real dates. A user may setup a virtual date with another user. The location of the actual date may be placed into the dating system. When one users reaches the actual date location, the user can receive a location alert (e.g., an automatic text message) of how far away the other user is from the location. Similarly, the user that is in-route to the location may receive an automatic text message (or other form of communication) that the other user has reached the actual dating point. Location software may then be utilized, for example, for dates to find one another if large settings are chosen for dates (e.g., carnivals). Such a scheme may, for example, allow users to not appear like they are looking for someone they have never met before while they are looking for someone they have never met before. Such location-based services may be provided, for example, on a users mobile telephonic device. Locating signals (e.g., GPS satellite signals or signals received from positioning towers) may be provided to a dating service via a user's permission. Such a user may utilize portion 221 to set permissions (or may utilize a website associated with the user's mobile device to set permissions for the dating website by, for example, entering in the web address of the dating website). Portion 221 may allow a user to control access rights to allow another user that the user is dating to locate his/her cell phone. Portion 221 may control permissions for who can text a particular cell phone. For example, an anonymous text messaging service may be provided where a user is provided with a dynamic telephone number, to which texts can be sent and routed to a different telephone number. Anonymous cell phone forwarding may be provided (e.g., via the generation of a dynamic telephone number). Users can control whether blocked calls may be forwarded to a particular dynamic telephone number.

Portion 230 may be provided that provides a VoIP telephone number to a user. Accordingly, the user can provide the VoIP telephone number to another user and that other user can call GUI 200 directly. In other words, for example, the voice data provided to the telephone number may be routed through, and played through, GUI 200. Accordingly, users without a webcam or microphone can utilize their home telephones to talk to a user of the website. Similarly, the VoIP telephone number may be, for example, a dynamic number and the destination of a call to that dynamic number may be changed at any time (e.g., GUI 200, a cell phone, a landline). A user may login to a system and change his/her destination preferences at any time or may provide conditional constraints to when particular destinations are used (e.g., work number at night, home number during the day or GUI 200 when logged in and cell phone when not logged in). A user may change the dynamic number at any time. An identification number may be provided on portion 130 that may also be provided to a user such that the other user has to enter in that identification number after the dynamic number is called. As such, a dynamic number may be changed relatively quickly (and that dynamic utilized with a number of different users) while, for example, reducing the possibility that a user trying to communicate with one user accidently communicates with another user. Buttons may be provided to change a dynamic number or create additional dynamic numbers. Call logs may be recorded and call forwarding may be provided. Portion 140 may allow a user's webcam audio/video data (e.g., a date interest) to be provided to a different user (e.g., the user of GUI 200).

Figure 3:
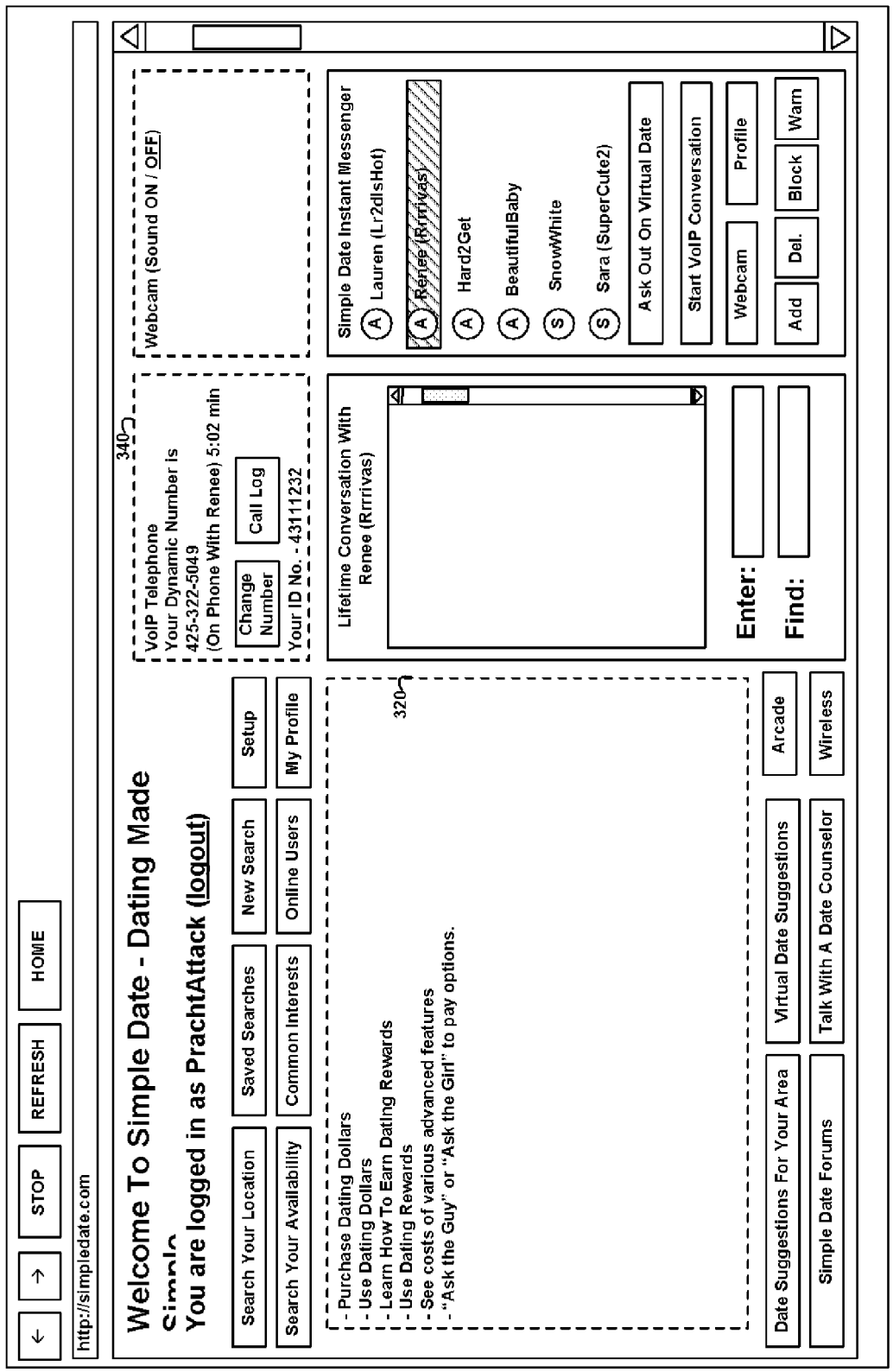
FIG. 3 is an illustration of a graphical user interface for a dating website constructed in accordance with the principles of the present invention.

FIG. 3 shows GUI 300 that may include portion 340 that may be utilized to provide call information such as, for example, the person that is calling a data server and being routed to GUI 300 and the amount of time that has elapsed.

Persons skilled in the art will appreciate that a dating service may be provided in which users can initiate audio contact through the microphones/webcameras attached to, or residing in, the users' computers. Portion 320 may be provided to allow a user to, for example, purchase dating dollars (e.g., and/or rewards), use dating dollars, learn how to earn dating rewards (e.g., learn about how one can use virtual currency to earn virtual rewards such as virtual prize tickets), use dating rewards (e.g., to obtain actual/virtual prizes0, see the costs of various advanced features (e.g., costs of various virtual dates), and an "ask the guy," "ask the girl," or "ask the other person" to pay options for any particular feature or sets of features (e.g., the dating service). Persons skilled in the art will appreciate that users may ask users of the same sex out on dates. Accordingly, users may be allowed to add distinguishing indicia to their virtual avatars indicative of sexual orientation. Alternatively, for example, virtual environments and virtual dates may be setup that are associated with particular orientations. For example, users that do not publicly state they are a particular sexual orientation may not be allowed to enter particular virtual environments or go on particular virtual dates or purchase particular virtual indicia. Persons may utilize a dating website without selecting a sexual orientation and a non-selection of sexual orientation may be utilized as a category of sexual orientation. Persons may also chose multiple sexual orientations (e.g., a female/male and female/female sexual orientations). Such persons may, for example, be able to utilize the features (e.g., virtual environments) of each of the selected virtual environments. Virtual environments may be provided with limits to users. For example, a male/female virtual environment may be limited to a particular percentage of male users to female users, a particular total number of users, and/or a particular total number of users of a particular sex (or other characteristic such as age). Accordingly, for example, a virtual environment for Detroit singles may be provided in which the ratio of men to female must stay between 1:1 and 2:1 and users must, for example, be between the age of 21 and 30 and within a predetermined area (e.g., Detroit) to utilize the environment. Accordingly, dating environments may be set up that increase the chance of users continuing a relationship into an actual date.

Figure 4:
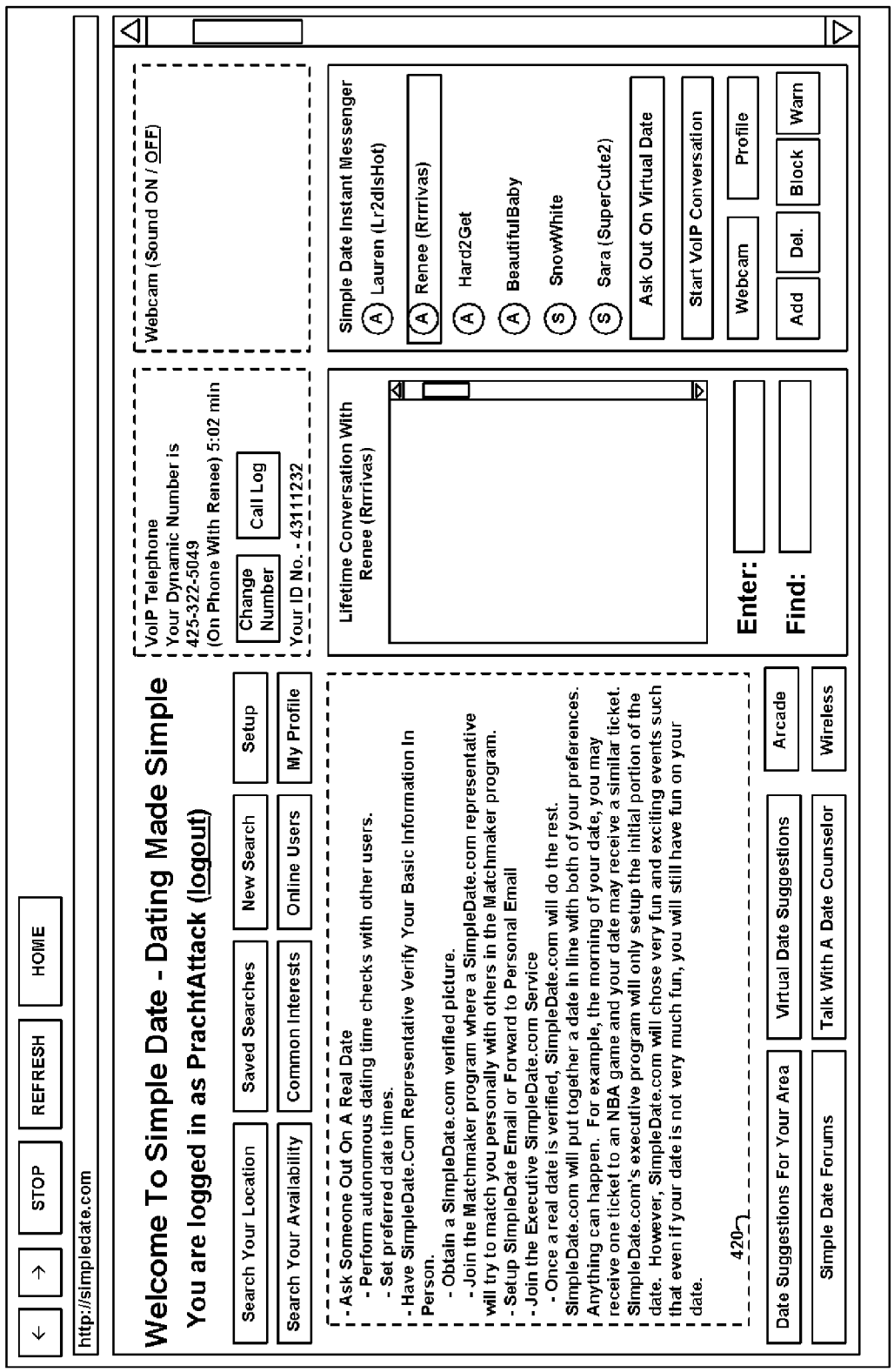
FIG. 4 is an illustration of a graphical user interface for a dating website constructed in accordance with the principles of the present invention.

FIG. 4 shows GUI 400 shows GUI 400 that may include portion 420. Portion 420 may include any number of user interfaces and may be utilized to initiate any number of features. For example, portion 420 may allow a user the ability to ask a user out on a real, actual date. Such a feature may autonomously compare the schedules of each user to offer times during which a date can occur. Users may provide times that dates are preferred as well as times where the users are busy. Virtual dating may also utilize such a calendar organization system. For, a user may indicate that he/she is available for virtual dates MW from 10 pm-11 pm. A different user may utilize this as search criteria and, accordingly, may request to schedule a future virtual date with the user.

Person skilled in the art will appreciate that pictures, or other facts entered in by a user, may be confirmed in a variety of ways. Such fact confirmation may be associated with a cost and may be associated with a user's profile. For example, an option may be provided in which a dating website will verify the authenticity of a picture. For example, a button may schedule a time for a user to take his/her picture at a certified photographer for the dating website. The user may provide the photographer with his/her id and a picture may be taken. The picture may include a watermark in the form of a time stamp, certification, and name of the user. Certified videos may also be recorded at a certified videographer. Accordingly, for example, users with certified pictures/videos may be more likely, for example, to please another dating user on an actual date as the expectations of the physical appearance of the user may be more in line with the actual physical appearance of the user. Such a scheme may also, for example, decrease the ability for a user to utilize a false identity. Pictures may be verified in a variety of ways. For example, the dating community may verify the accuracy of a picture. After each real date, a user may be able to verify (e.g., via a point system) the accuracy of the photo. The number of users that have graded a photo and the average score of the photo or photo collection (on accuracy) may be provided. Users may be motivated to provide such feedback as such users may be provided with prize tickets or other rewards (e.g., discounts on fees) for performing such feedback activities. A user may delete a picture in order to, for example, have all feedback associated with the picture removed. A user may also designate a picture as an old picture after a period of time such that feedback cannot be added to the picture. An picture marked at old may be accompanied by indicia representative of the fact that the picture is old. The feedback for an old picture may still be reviewed by other users. Users may also add comments to the picture and users may select a number of comments (e.g., top three) to display on the website). Alternatively, comments that are displayed may be randomized. A user may be provided with the ability to strike one or a pre-determined number or percentage of comments. A dating system may, for example, keep comments hidden. Date feedback may also be obtained and summary of date feedback may also be provided.

Matchmaker services may be purchased. A set amount of time of a matchmaker may be provided for free to each user. Such a matchmaker may, for example, be a certified photographer/videographer and may be utilized to verify comments of a user's profile (which then may be displayed to the dating service community). A matchmaking service may setup real dates with others in the matchmaking service or outside of the matchmaking service (e.g., within the dating website but outside of the matchmaking service). The matchmaker may, for example, also setup dates based on a user's calendar and the matchmaker may book dates (e.g., buy actual dinner tickets and make actual dinner reservations). Particularly activities of a matchmaker may be provided as an autonomous computer program running on a server (e.g., selecting dating events for particular days/times for a person that is a matchmaker). A user of a matchmaking service may pay a cost for a particular tier of service. An executive tier may include, for example, one date a week that is setup by a matchmaker. Accordingly, for example, the service may mail tickets and reservation instructions to each user for a date via an overnight delivery service the day of, day before, or more than a day before (e.g., week before) the actual date. An executive tier matchmaking service may, for example, allow a matchmaker to provide free dates to users not in the executive matchmaking service. Accordingly, users may be more inclined to go on dates with members of the executive service as the users may be perceived as more desirable users. Users may forward email from a dating website to another email and/or setup an email service on the dating website.

Figure 5:
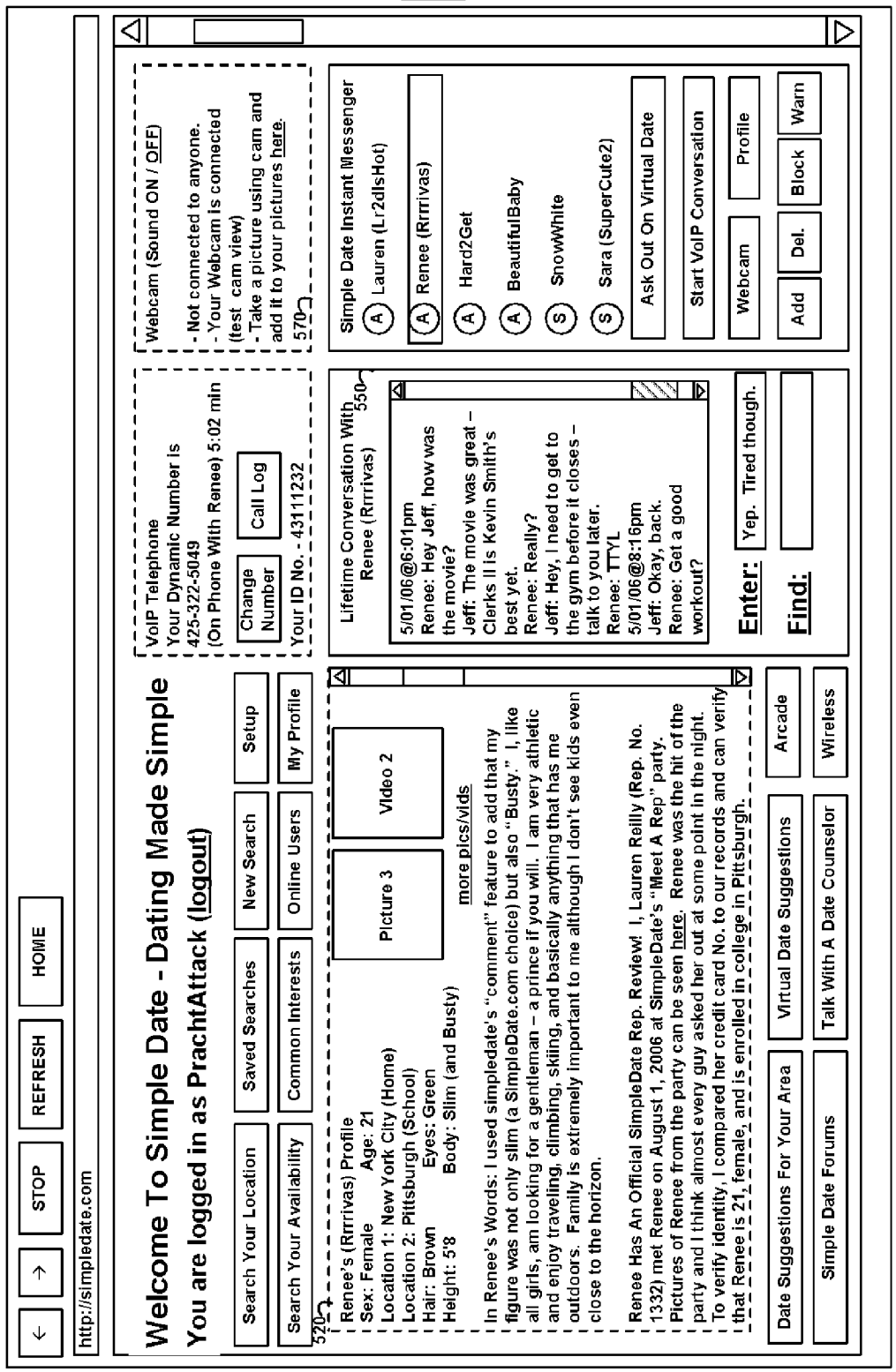
FIG. 5 is an illustration of a graphical user interface for a dating website constructed in accordance with the principles of the present invention.

FIG. 5 shows GUI 500 that may include instant messenger portion 550. Instant messenger portion 550 may include the ability for multiple users (e.g., two or more users) to enter in information and see information other users entered into the instant messaging portion. Portion 570 may be included for webcam options (e.g., ON/OFF). The status of a webcam may be included in portion 570 such as, for example, who the user is connected to. Webcam tests may be performed using portion 570 and the operability status (e.g., connected properly, working) may be provided. A picture may be taken via a webcam using portion 570. Such a picture may automatically be saved to a remote server and associated with a user's profile. Such a picture may also automatically be visible for other users to see. Alternatively, for example, a user may be required to verify that a picture taken by a webcam and automatically saved by a dating website is desired to be made public on the dating website. Information may be embedded and certified into the picture (e.g., via a watermark). For example, a watermark "taken through simpledate.com on Jan. 1, 2008" may be utilized to confirm that at least a picture was taken using the user's account on a particular date. Video may similarly be captured and certified utilize a webcamera and portion 570. Portion 520 may be, for example, associated with a users profile. Portion 520 may be visible to all users (or types of users that were provided permission to see the profile by the user associated with the profile). Certified administrators may provide comments on portion 520. Certified administrator comments may be visible to the entire community and a user may (or may not) be provided with the ability to hide and/or delete these comments.

Figure 6:
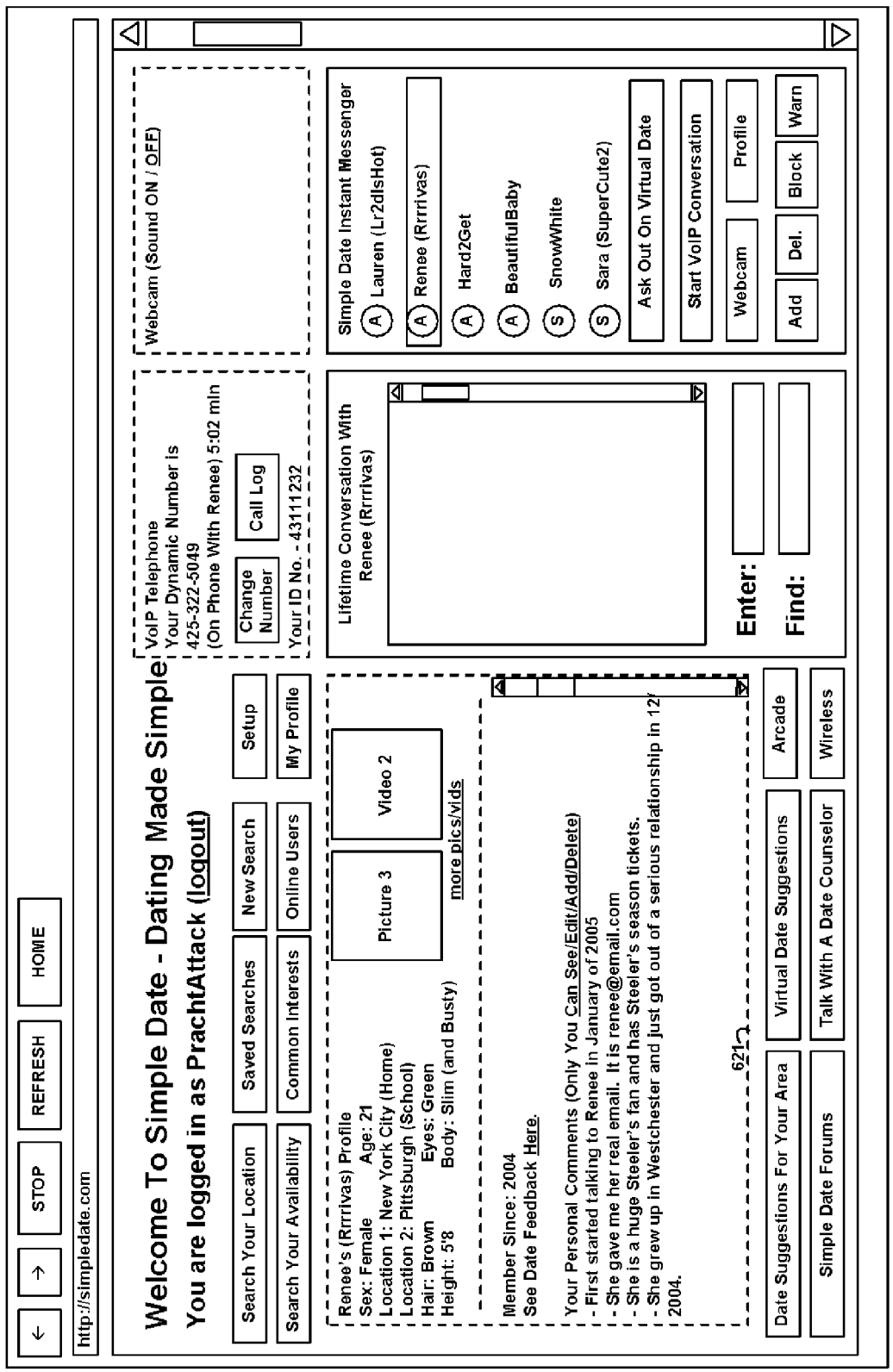
FIG. 6 is an illustration of a graphical user interface for a dating website constructed in accordance with the principles of the present invention.

FIG. 6 shows GUI 600 that may include profile and feature portion 621. Portion 621 may be shown to a user and may allow a user to enter date feedback for the user associated with the profile. Additionally, a user may be provided with a section of portion 621 in which the user can enter in comments that only he/she can see. Accordingly, a user can leave notes about a user that remain private but that appear whenever a user views the profile of the user associated with portion 621.

Persons skilled in the art will also appreciate that the present invention is not limited to only the embodiments described. Instead, the present invention more generally involves social networking—both mobile and stationary. Persons skilled in the art will also appreciate that the apparatus of the present invention may be implemented in other ways then those described herein. All such modifications are within the scope of the present invention, which is limited only by the claims that follow.

What is claimed is:

1. A method comprising:
   receiving a telephone number on a system;
   displaying on said system an option to request the generation of a dynamic telephone number;
   receiving on said system a request for the generation of said dynamic telephone number;
   associating on said system said dynamic telephone number to said telephone number;
   displaying on said system said dynamic telephone number;
   receiving on said system a call to said dynamic telephone number;
   routing on said system said call to said telephone number; and
   deleting on said system said dynamic telephone number.

2. The method of claim 1, wherein said dynamic telephone number is displayed on a dating website.

3. The method of claim 1, further comprising providing on said system a second dynamic telephone number that is operable for a period of time.

4. The method of claim 1, further comprising providing on said system a second dynamic telephone number that is operable for a pre-determined number of uses.

5. The method of claim 1, wherein said telephone number is a mobile telephone number.

6. The method of claim 1, wherein said generation of said dynamic telephone number includes a first cost and the use of said dynamic telephone number includes a second cost.

7. The method of claim 1, wherein said dynamic telephone number is saved on a dating website.

8. The method of claim 1, further comprising providing on said system a second dynamic telephone number.

9. The method of claim 1, wherein said generation of said dynamic telephone number includes a cost.

10. The method of claim 1, wherein the use of said dynamic telephone number includes a cost.

11. The method of claim 1, wherein said dynamic telephone number is displayed on a website.

* * * * *